UNITED STATES PATENT OFFICE.

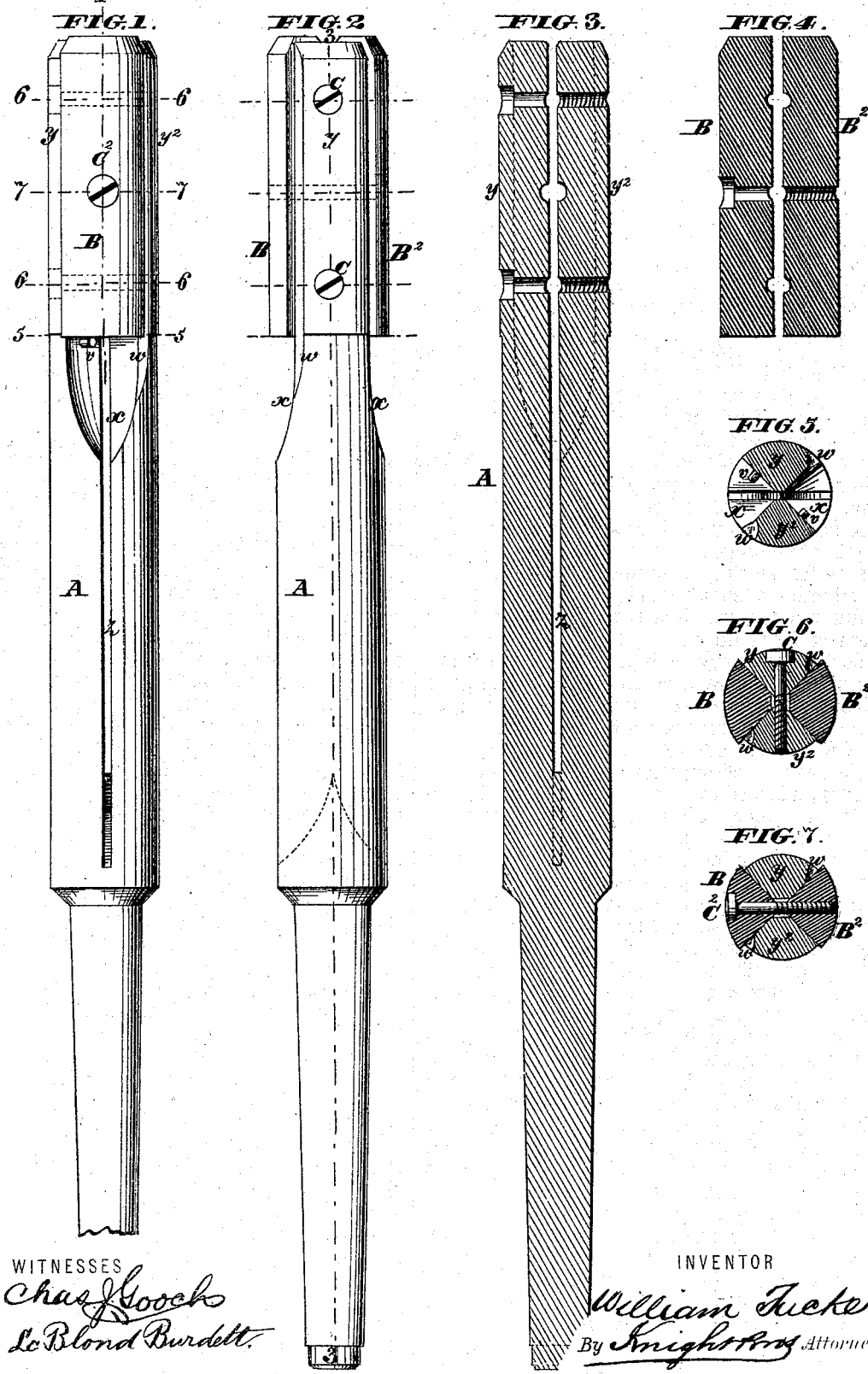

WILLIAM TUCKER, OF FISKEDALE, MASSACHUSETTS.

IMPROVEMENT IN ADJUSTABLE REAMERS.

Specification forming part of Letters Patent No. 182,496, dated September 19, 1876; application filed March 27, 1876.

*To all whom it may concern:*

Be it known that I, WILLIAM TUCKER, of Fiskedale, in the county of Worcester and State of Massachusetts, have invented a new and useful Improvement in Adjustable Reamers, of which the following is a specification:

This invention relates to machinists' tools for reaming and tapping holes in iron.

The required number of solid reamers and taps for general use in an average machine-shop forms a very extensive, expensive, and inconvenient collection. More than this, in the now extensive manufacture of machinery with interchangeable parts, and of duplicate parts for sewing-machines and the like, the production of such parts by means of ordinary solid reamers requires that new reamers be constantly made, as they begin to diminish in size from the very beginning of their use, and very soon change so much as not to give gage size, when new ones must be substituted, or confusion is introduced into the work.

The present device is an improved adjustable reamer of superior simplicity and efficiency, adapted to enlarge holes to any indefinite diameter within a certain capacity, or to be maintained at a given exact size by expanding the bits or cuts as they are worn away in use, and by resharpening.

The invention consists in the peculiar construction of the said adjustable reamer whereby it is adapted to be cheaply and conveniently manufactured, and to be readily adjusted, and to cut smoothly and truly, as hereinafter set forth.

The accompanying drawing represents an adjustable reamer illustrating this invention.

Figure 1 and Fig. 2 are side views from points at right angles to each other. Fig. 3 and Fig. 4 represent longitudinal sections of the stock and cutting-bits on the lines 3 3 and 4 4, respectively. Figs. 5, 6, and 7 represent transverse sections of the whole reamer on the lines correspondingly numbered.

Like letters of reference indicate corresponding parts in the several figures.

This adjustable reamer is composed of an iron stock, A, and a pair of cutting-bits or cuts, B $B^2$, of tempered steel, with three or more screws, C $C^2$, by which the parts are united and adjusted. The body of the stock A is divided longitudinally throughout nearly its entire length by a kerf, $z$, and the space between the jaws $y$ $y^2$, thus formed, is enlarged on each side to form angular seats $x x$, with laterally-inclined walls, to accommodate the bits B $B^2$, which have corresponding wedge-shaped backs or inclined sides, as shown in Figs. 5, 6, and 7. The jaws $y$ $y^2$ are further cut away to form chip-grooves $w w$ along the cutting-edges of the bits, and are provided with inwardly-projecting short studs or stop-pins $v v$, to engage with the square inner ends of the bits. The bits have curved outer surfaces and beveled outer ends, and their effective longitudinal edges are formed by the junctions of their inclined sides with the curved outer surface of each. The jaws $y$ $y^2$ of the stock and the bits B $B^2$ are drilled, tapped, and notched for the accommodation of the screws C $C^2$, as clearly shown in Figs. 3 and 4. The screws C unite the jaws $y y$, and the screw or screws $C^2$ unite the bits B $B^2$, as clearly shown in Figs. 6 and 7. In the illustration but one of the latter is shown, but in practice at least two will usually be employed, to facilitate adjusting the bits. The screws are designed to be arranged in pairs, (one of each set,) and in quite long reamers several pairs will be employed to give the bits the firmness they require in order to adapt them to cut smoothly and perfectly round. The two sets of screws are antagonistic, crossing each other at right angles, as shown.

The bits are expanded by loosening the screw or screws $C^2$, and tightening the screws C to correspond. The scope of adjustability depends on the size of the tool. Interchangeable bits will be supplied to adapt each to give an extended range of holes (of indefinite diameter) within given limits. The bits, while at work, are always tightly clamped between the jaws or holding sides of the stock, and increased strain only tends to render them more solid. The extended straight surfaces of the seats $x$ and the backs of the bits insure trueness, and are adapted to be readily formed with mechanical accuracy.

To turn the curved outer surfaces of the bits so as to secure the required saliency of the cutting and heel edges: Clamp the jaws $y$ $y^2$ tightly together by their screws C, and place something of about the thickness of tin in each of the seats $x$. Then place the bits B B$^2$ in the contracted troughs thus formed, and hold them thus by their screw or screws C$^2$. The bits are thus held a little further out than they will ever be in use. Then put the stock in the lathe and turn to the proper size. The periphery of each bit is thus turned on a larger circle than it will ever describe when the bits are in their seats without anything interposed, which renders the cutting-edge and heel-edge prominent, and just enough so to give a cut and a sufficient support to prevent chattering, so as to produce a perfectly smooth, round hole. After turning the bits, as above described, they are tempered, and are then ready for use.

Substantially the same tool may be used as a tap for cutting internal screws by forming the bits with their curved surfaces or peripheries threaded. A "taper-reamer" is produced by simply giving a tapering form to the bits. A "chuck-reamer" need not differ from the form shown in the drawing, except that the shank would be better flat, like that of a chuck-drill, instead of round, as in the illustration.

The following is claimed as new and of this invention, namely:

The improved adjustable reamer herein described, consisting of a stock, A, having a pair of jaws, $y$ $y^2$, with angular bit-seats $x$ $x$ between them, cutting-bits or cuts B B$^2$, having wedge-shaped backs fitting into the said seats, and adjusting-screws C C$^2$, uniting the said jaws and the bits respectively, substantially as illustrated and set forth, for the purposes specified.

WILLIAM TUCKER.

Witnesses:
 DAVID WIGHT,
 THOS. R. PHETTEPLACE.